United States Patent
Jeon et al.

(10) Patent No.: US 12,172,572 B2
(45) Date of Patent: Dec. 24, 2024

(54) OPERATION APPARATUS FOR VEHICLE

(71) Applicant: SEOYON E-HWA CO., LTD., Anyang (KR)

(72) Inventors: Jong Hwan Jeon, Anyang (KR); Jung Jin Jeon, Siheung (KR)

(73) Assignee: SEOYON E-HWA CO., LTD., Anyang (KR)

( * ) Notice: Subject to any disclaimer, the term of this patent is extended or adjusted under 35 U.S.C. 154(b) by 299 days.

(21) Appl. No.: 17/934,203

(22) Filed: Sep. 22, 2022

(65) Prior Publication Data

US 2023/0136074 A1 May 4, 2023

(30) Foreign Application Priority Data

Oct. 30, 2021 (KR) .................. 10-2021-0147498

(51) Int. Cl.
*H01H 13/14* (2006.01)
*B60K 35/10* (2024.01)
(Continued)

(52) U.S. Cl.
CPC .............. *B60Q 3/233* (2017.02); *B60K 35/10* (2024.01); *B60Q 3/82* (2017.02);
(Continued)

(58) Field of Classification Search
CPC ...... H01H 3/125; H01H 13/705; H01H 13/14; H01H 13/04; H01H 13/10; H01H 13/70; H01H 13/704; H01H 13/7065; H01H 13/7006; H01H 13/7057; H01H 13/78; H01H 13/79; H01H 13/52; H01H 13/703; H01H 13/507; H01H 3/12; H01H 13/20; B60Q 3/233; B60Q 3/82; B60K 35/10; B60K 2360/128; B60K 2360/682;
(Continued)

(56) References Cited

U.S. PATENT DOCUMENTS 8,787,029 B2 * 7/2014 Yang ..................... H01H 9/16
361/679.01
10,276,326 B1 * 4/2019 Wang .................... H01H 13/83
(Continued)

FOREIGN PATENT DOCUMENTS

JP      2019-127139 A    8/2019
KR      10-1550604 B1    9/2015
(Continued)

OTHER PUBLICATIONS

KR OA mailed Jan. 7, 2022.

*Primary Examiner* — Ahmed M Saeed
(74) *Attorney, Agent, or Firm* — Harvest IP Law, LLP (57) ABSTRACT

An operation apparatus for a vehicle is proposed. The operation apparatus includes an operation module capable of moving between a first position and a second position through an opening of a panel provided in the vehicle, and a drive unit that moves the operation module. The drive unit may move the operation module from the first position to the second position to make a button of the operation module conspicuously protrude from a surface of the panel, and may rotate the operation module so that an angle of the button of the operation module can be adjusted to allow a user to conveniently operate the button.

11 Claims, 6 Drawing Sheets

(51) Int. Cl.
  *B60Q 3/233* (2017.01)
  *B60Q 3/82* (2017.01)
  *B60R 13/02* (2006.01)

(52) U.S. Cl.
  CPC .. *B60K 2360/128* (2024.01); *B60K 2360/682* (2024.01); *B60R 2013/0287* (2013.01)

(58) Field of Classification Search
  CPC ........ B60K 2360/126; B60K 2360/688; B60R 2013/0287; B60R 2011/0082; B60R 2011/0092; B60R 11/0264; B60R 16/005
  See application file for complete search history.

(56) References Cited

U.S. PATENT DOCUMENTS

| | | |
|---|---|---|
| 2015/0088336 A1 | 3/2015 | Shin |
| 2020/0101845 A1* | 4/2020 | Baek ..................... B60K 35/10 |

FOREIGN PATENT DOCUMENTS

| | | |
|---|---|---|
| KR | 10-2019-0036714 A | 4/2019 |
| KR | 10-2101754 B1 | 4/2020 |
| KR | 10-2277316 B1 | 7/2021 |
| KR | 10-2277318 B1 | 7/2021 |

* cited by examiner

OPERATION APPARATUS FOR VEHICLE

CROSS REFERENCE TO RELATED APPLICATION

The present application claims priority to Korean Patent Application No. 10-2021-0147498, filed Oct. 30, 2021, the entire contents of which is incorporated herein for all purposes by this reference.

BACKGROUND OF THE INVENTION

Field of the Invention

The present disclosure relates to an operation apparatus having a button used by a user to operate devices included in a vehicle, primarily from an inside of the vehicle.

Description of the Related Art

In general, vehicles are equipped with an array of devices related to driving to improve comfort and convenience of a user (driver and/or passenger). These devices are controlled by buttons (or switches) that the user directly manipulates.

The buttons may be provided in various forms in an interior of the vehicle. In recent years, as vehicles have come equipped with more functions, the number of buttons disposed in the interior of the vehicle is gradually increasing. This may give the user an impression that it is difficult or complicated to use the buttons, or may cause the user to make a mistake in operating the buttons. In addition, cluttered vehicle interiors with too many buttons may degrade the aesthetic quality of the interior of the vehicle.

SUMMARY OF THE INVENTION

Accordingly, the present disclosure has been made keeping in mind the above described problems, and is intended to provide an operation apparatus for a vehicle that improves the visibility of a button and the aesthetic value of the vehicle's interior by making the button appear and disappear.

Another objective of the present disclosure is to provide an operation apparatus for a vehicle that is more advantageous in terms of the operability of the buttons.

The objectives of the present disclosure are not limited to those mentioned above, and other objectives not mentioned will be clearly understood by those skilled in the art from the following description.

In order to achieve the above objectives, according to an embodiment of the present disclosure, there is provided an operation apparatus for a vehicle, the operation apparatus including: a panel provided in the vehicle; an operation module capable of moving between a first position and a second position located forward of the first position in a first direction through an opening of the panel, and having a button disposed at a front end thereof; and a drive unit configured to move the operation module from the first position to the second position to make the button protrude from a surface of the panel, and to change an angle of the protruded button by including a rotary motion.

The drive unit may include: an actuator having a moving body that linearly moves in the first direction, wherein the moving body is rotatably connected to a side of a rear portion of the operation module by a connecting shaft extending in a second direction orthogonal to the first direction; and a guide that provides a guide path for guiding the moving of the operation module from the first position to the second position, wherein the moving of the operation module is initiated by the actuator; and the guide path includes a first path inducing a linear motion of the operation module and a second path inducing the rotary motion of the operation module. The drive unit may further include: a linear motor for moving the moving body.

The guide may include a guide pin and a pin guide member, which mate with each other. The guide pin may protrude from the operation module in the second direction, moves along the guide path, and may be disposed to be spaced apart from a connecting position that links the moving body and the operation module along a third direction perpendicular to a plane created by an intersection of the first direction and the second direction. The pin guide member may have the guide path into which the guide pin is inserted, and may be configured such that the first path is provided in the first direction and the second path extends from the first path so as to move away from the connecting position of the moving body with respect to the operation module.

The operation apparatus according to the embodiment of the present disclosure may further include: a finish skin that provides a finished surface by covering the surface of the panel and the button, has flexibility, and is configured such that a part covering the button is moved with the button so that a shape of the finished surface is changed according to a moving direction of the button.

The operation module may have a light source built in the button, the button may have a light-transmitting area on a surface thereof for transmitting light from the light source, and the finish skin may be light-transmissive.

The operation apparatus according to the embodiment of the present disclosure may further include: a sensor that detects a user's action state for manipulating the button; and a control unit for controlling the drive unit on the basis of a detection signal from the sensor.

The operation module may be configured such that a surface of the button is flush with a surface of the panel in the first position. The operation module may be controlled by the control unit. The operation apparatus according to the embodiment of the present disclosure may be configured such that the operation module may be switched to an active state in the second position and an inactive state in the first position.

According to an embodiment of the present disclosure, depending on the position of an operation module, a button may be in a state easily seen by a user (for example, a state in which the operation module is located in the second position in the front so that the button protrudes from the surface of a panel) or in a state difficult to be seen by the user (for example, a state in which the operation module is located in the first position at the rear so that the surface of the button is flush with the surface of the panel). Accordingly, regarding the button, it is possible to provide better visibility and improved design.

Furthermore, since the button protruding from the surface of the panel is rotated by a predetermined angle, the angle of the button can be adjusted to allow the user to conveniently manipulate the button.

The effects of the present disclosure are not limited to those mentioned above, and other effects not mentioned will be clearly understood by those skilled in the art from this specification and accompanying drawings. In addition, various solutions other than the aforementioned ones may be additionally suggested below.

BRIEF DESCRIPTION OF THE DRAWINGS

The above-mentioned objectives and other objectives, features, and advantages will be further clarified by the following detailed description in conjunction with the accompanying drawings, in which.

DETAILED DESCRIPTION OF THE INVENTION

Hereinafter, embodiments of the present disclosure will be described with reference to the accompanying drawings.

The terminology used herein is for the purpose of describing particular embodiments only and is not intended to be limiting the present disclosure. As used herein, the singular forms are intended to include the plural forms as well, unless the context clearly indicates otherwise. It will be further understood that the terms "comprises", "includes", or the like when used herein, specify the presence of stated features, steps, operations, elements, components, or combinations thereof, but do not preclude the presence or addition of one or more other features, steps, operations, elements, components, or combinations thereof.

According to an embodiment of the present disclosure, an operation apparatus for a vehicle, a vehicle including the same, etc. may be provided. The operation apparatus may be used to operate various devices included in a vehicle. For example, devices operated by the operation apparatus (hereinafter referred to as a device to be operated) may include a navigation device, an air conditioning device, a sound device, a lighting device, a door lock device, a door opening or closing device, a motor/engine starting device, a driving speed control device, etc. Therefore, the vehicle according to the embodiment of the present disclosure may include the operation apparatus and at least one or more devices to be operated by the operation apparatus. The operation apparatus and the device to be operated may be electrically connected to each other.

The operation apparatus is installed in a vehicle and includes a button manipulated by a user. The operation apparatus may be provided to constitute a part of a vehicle. The part to which the operation apparatus is applied may be primarily an interior part of a vehicle. For example, the interior part may be a door trim, a ceiling panel, a dashboard, a console, a seat, an armrest, and the central part of a steering wheel (hub), etc. Embodiments of the present disclosure will be mainly focused on application of the operation apparatus to an interior part of a vehicle.

The structure and operation of the operation apparatus are exemplified in FIGS. 1 to 6.

Figure 1:
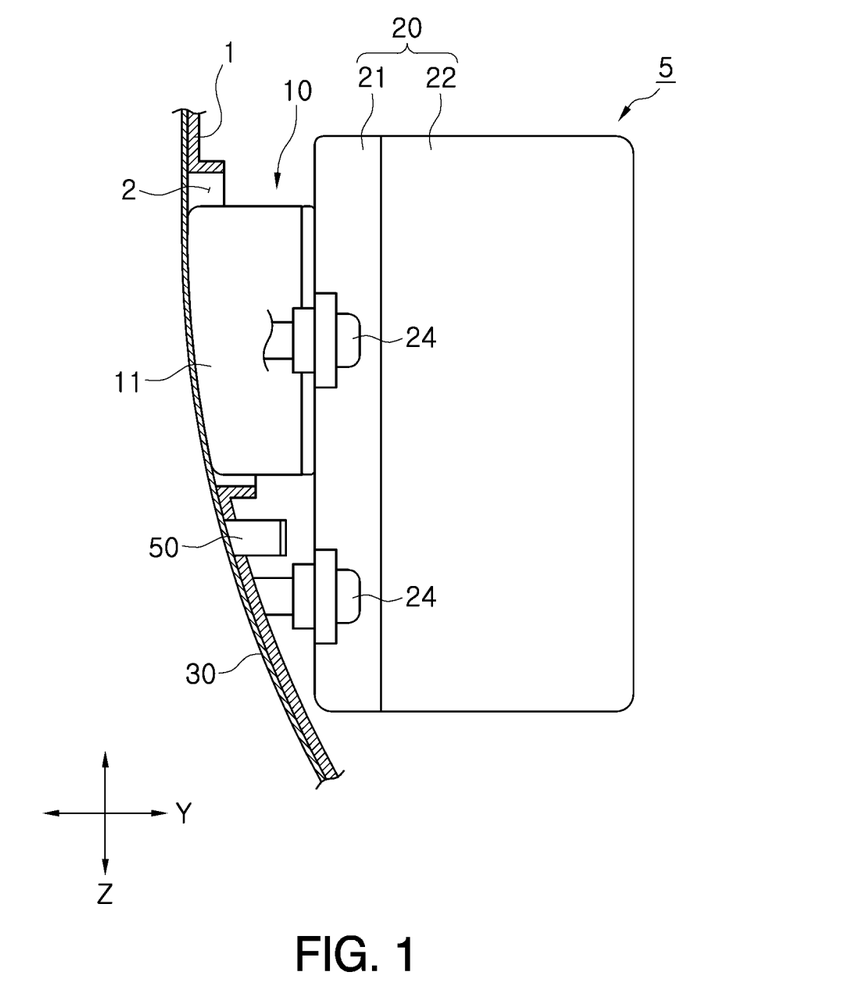
FIG. 1 is a side view illustrating an operation apparatus for a vehicle according to an embodiment of the present disclosure.

As illustrated in FIG. 1, the operation apparatus includes: a panel 1 constituting an interior part of a vehicle; and at least one operation module assembly 5 provided on the panel 1.

The panel 1 has a panel surface and a panel back surface. The panel 1 may be configured such that the panel surface provides only a part of the surface of an interior part depending on the type, shape, etc. of the interior part, or that the panel surface provides the entire surface of the interior part. The panel 1 has an opening 2. The opening 2 is provided to penetrate the panel 1 through the panel surface and the panel back surface.

The operation module assembly 5 includes an operation module 10. The operation module 10 includes a button 11 manipulated by a user and is configured to operate, for example, in a touch manner. The button 11 is disposed at a front end of the operation module 10, and thus the operation module 10 has the front part including the front end composed of the button 11. The operation module 10 is moved in a front-back direction that is also referred to as a first direction (refer to Y-axis direction) with respect to the opening 2 of the panel 1, and the button 11 that moves together with the operation module 10 may appear and disappear through the opening 2. To make the button 11 appear and disappear, the button 11 may protrude in an embossed form with respect to the panel surface to reveal its position and/or shape (see FIGS. 5 and 6). The number of openings 2 may be increased or decreased according to the number of operation module assemblies 5 provided.

The operation apparatus further includes a skin 30 covering the surface of the panel and the button 11 to provide a finished surface. The skin 30 may be sized to cover some or all of the panel surface including the opening 2 of the panel 1. The skin 30 is flexible so that when the button 11 is moved, a part covering the button 11 (a part blocking the opening 2) is deformed by the button 11 and the shape of the finished surface may change. For example, the part covering the button 11 may be protruded by the button 11 in a generally flat shape of the finished surface (refer to FIGS. 5 and 6). When the finished surface is restored to a generally flat shape, the shape of the button 11 is hidden. Therefore, it is possible to prevent the interior of the vehicle from being cluttered with the button 11 (see FIGS. 1 and 4).

The skin 30 may be bonded to the panel surface. In addition, since the part covering the button 11 (the part that blocks the opening 2) is bonded to the surface of the button 11, the skin 30 may be moved together with the button 11 and precisely deformed. The bonding of the skin 30 to the panel surface and/or the bonding of the skin 30 to the surface of the button 11 may be made firmly by an adhesive or the like.

As illustrated in FIGS. 1, and 4 to 6, the operation module assembly 5 further includes a base 21 disposed at the rear of the panel 1, and a base cover 22 detachably coupled to the base 21 at the rear of the base 21. The base 21 and the base cover 22 constitute the case 20. The base 21 and the base cover 22 are configured to provide an accommodating space 23 therebetween which is partially or wholly blocked from the outside. The base 21 may be mounted on the back side of the panel by means of fastening elements 24 such as bolts. The base 21 has a through region 25 facing the opening 2 of the panel 1. For example, the through region 25 may be provided in the form of a hole.

The operation module 10 is, in a state in which the rear part is inserted into the through region 25 of the base 21, provided to be movable between a first position and a second position spaced apart from each other in the front-back direction (refer to the Y-axis direction) through the opening 2 of the panel 1. The first position is a position where the button 11 is accommodated in the opening 2, and the button 11 is formed such that the surface thereof is flush with the panel surface. The second position is located forward of the first position and is a position where the button 11 protrudes from the panel surface. When the operation module 10 is located in the first position, the skin 30 may hide the button 11 by providing a finished surface in a generally flat shape (see FIGS. 1 and 4). When the operation module 10 is moved to the second position, the button 11 protrudes from the panel surface and the skin 30 may be deformed into a shape in which a part covering the button 11 protrudes by the button 11 to reveal the position of the button 11 (see FIGS. 5 and 6).

Figure 4:
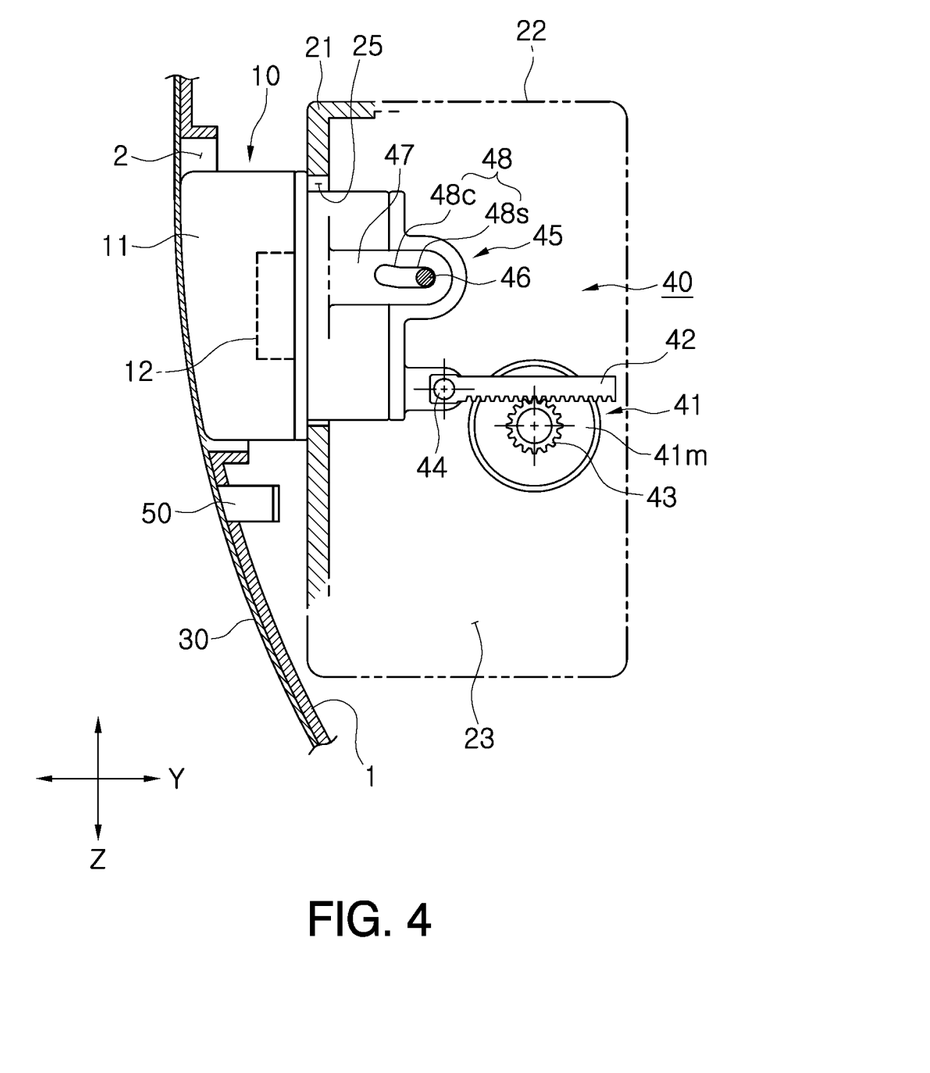
FIGS. 4 to 6 are side views illustrating the internal structure and operation of the operation apparatus for a vehicle according to the embodiment of the present disclosure.
Figure 5:
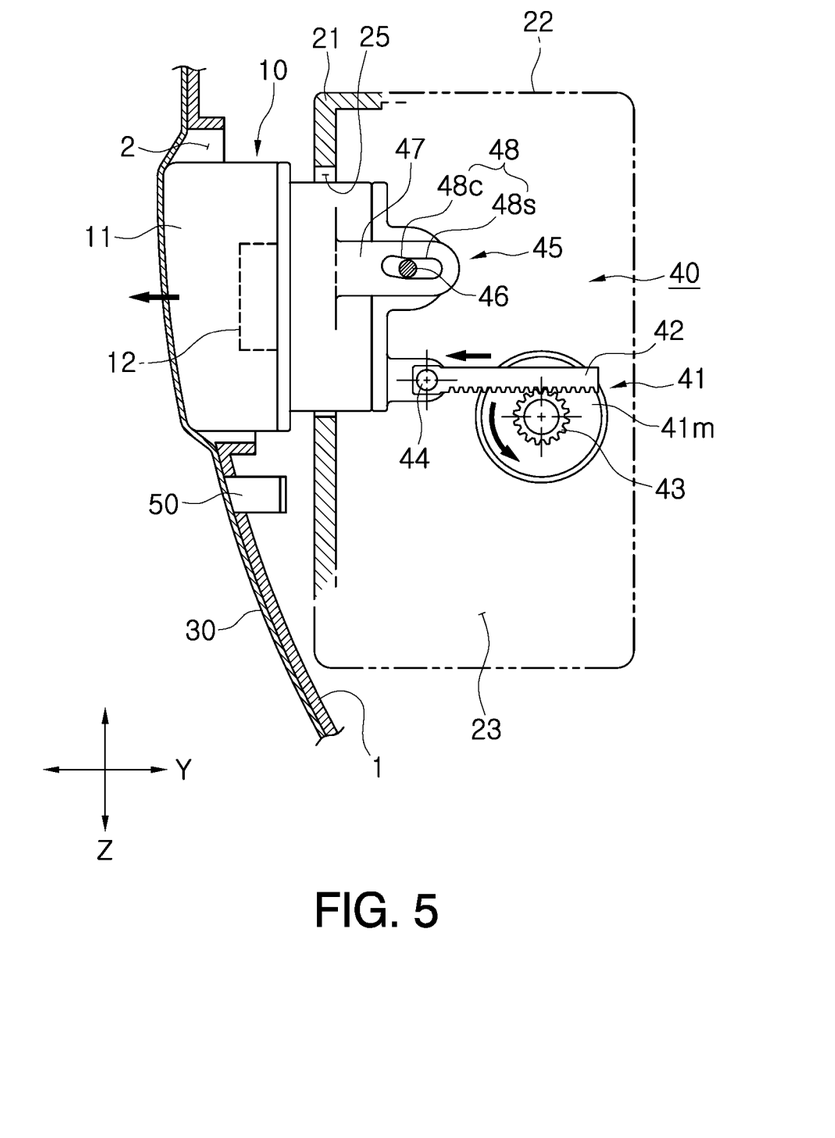
Figure 6:
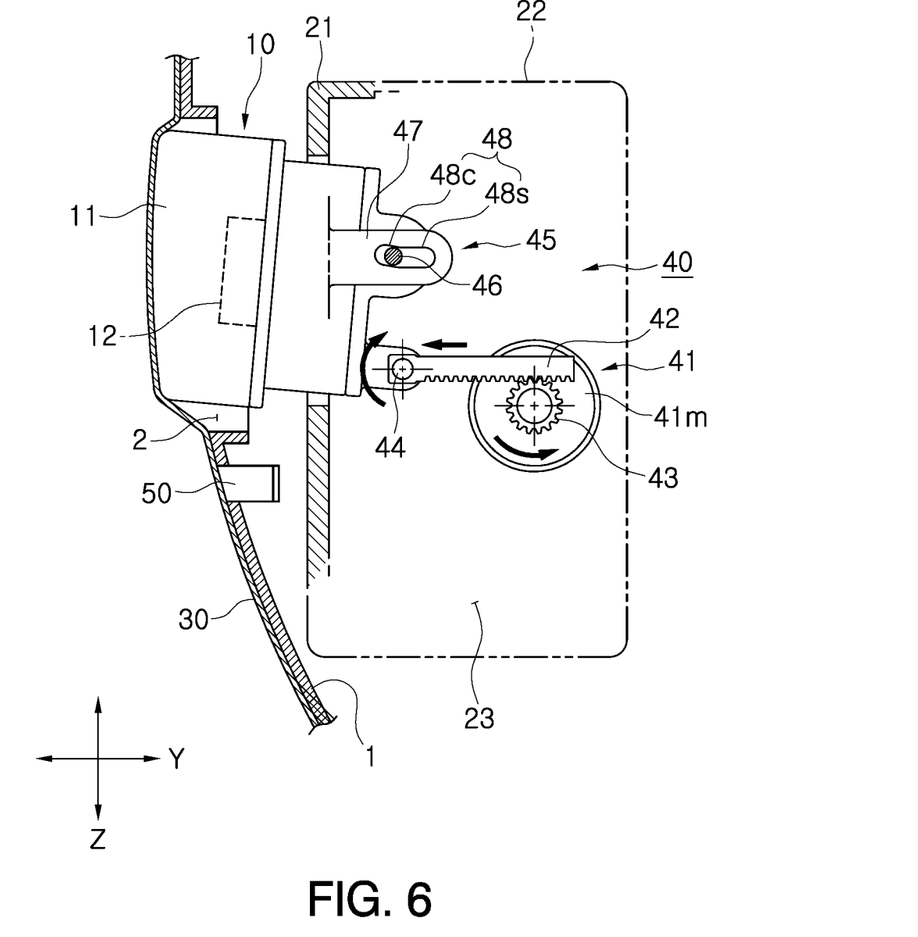

The operation module assembly 5 further includes a drive unit 40 for moving the operation module 10 in the front-back direction with respect to the opening 2 to position the operation module 10 in the first position or the second position. For reference, the drive unit 40 is schematically represented in FIGS. 4 to 6.

By the drive unit 40, the operation module 10 may be moved (move forward) from the first position to the second position. Accordingly, when the operation module 10 is located in the second position, the button 11 protrudes from the panel surface, and the skin 30 is deformed into a shape in which the part covering the button 11 protrudes (see FIGS. 5 and 6). Conversely, by the drive unit 40, the operation module 10 may be moved (move backward) from the second position to the first position. Accordingly, when the operation module 10 is located in the first position, the button 11 has a surface flush with the panel surface, and the skin 30 is restored to provide a generally flat finished surface (see FIGS. 1 and 4).

Figure 2:
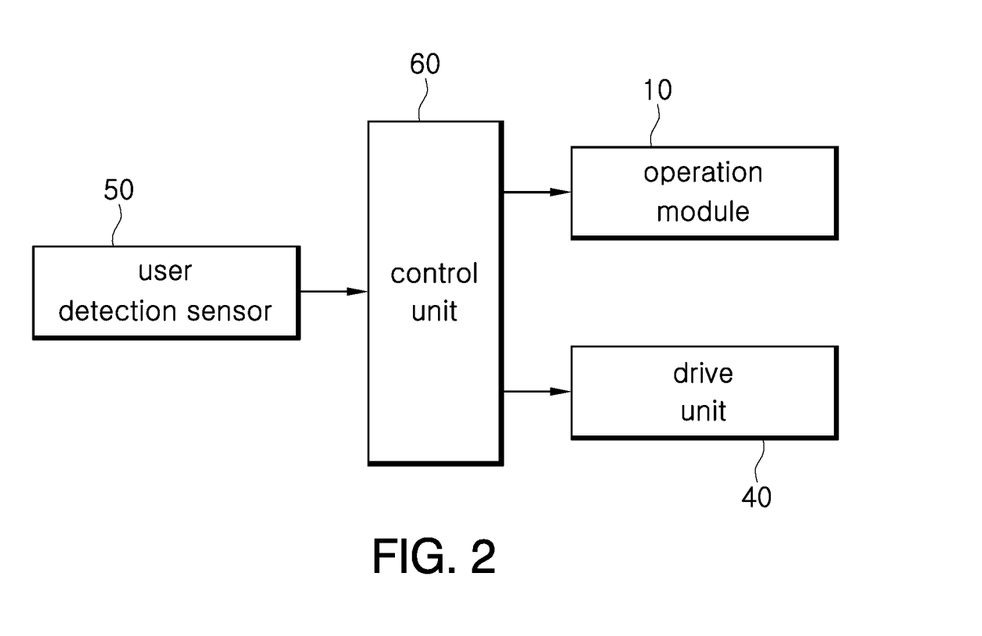
FIG. 2 is a block diagram illustrating an operation apparatus for a vehicle according to an embodiment of the present disclosure.

Referring to FIGS. 1 and 2, the operation apparatus further includes: a user detection sensor 50 for detecting a user's action state for manipulating the button 11; and a control unit 60 for controlling the operation module 10 and the drive unit 40 on the basis of a detection signal from the user detection sensor 50.

The user detection sensor 50 may be a proximity sensor that detects whether a user's body, such as a hand, is in proximity to the button 11. To be specific, the user detection sensor 50 may be an optical proximity sensor, a magnetic proximity sensor, an ultrasonic proximity sensor, a high frequency oscillation proximity sensor, a capacitive proximity sensor, or the like. For reference, among these sensors, the optical proximity sensor may include a light emitting element and a light receiving element receiving light from the light emitting element. The light emitting element may be a light emitting diode, and the light receiving element may be a phototransistor. For example, as shown in FIG. 1, the user detection sensor 50 may be provided around the opening 2 in the panel surface.

When a detection signal is input from the user detection sensor 50 while the operation module 10 is located in the first position, the control unit 60 determines that the user attempts to manipulate the button 11, and moves the operation module 10 from the first position to the second position by the control of the drive unit 40 (see FIGS. 5 and 6). When the button 11 is not manipulated for a preset time after the operation module 10 is located in the second position, the control unit 60 determines that the user does not want to manipulate the button 11, and moves the operation module 10 from the second position to the first position by the control of the drive unit 40 (see FIGS. 1 and 4).

The operation module 10 is kept in an inactive state in the first position and is kept in an active state in the second position. For this change of state of the operation module 10, the control unit 60 may control the operation module 10 to be in an inactive state when the operation module 10 is located in the first position, and control the operation module 10 to be in an active state when the operation module 10 is located in the second position. Due to the capability of switching between the active and inactive states with respect to the operation module 10, the user may manipulate the button 11 to operate a device to be operated when the operation module 10 is located in the second position, and while the operation module 10 is waiting in the first position, it is possible to prevent the button 11 from being actuated unintentionally by the user, thereby preventing the device to be operated from being unintentionally operated.

Figure 3:
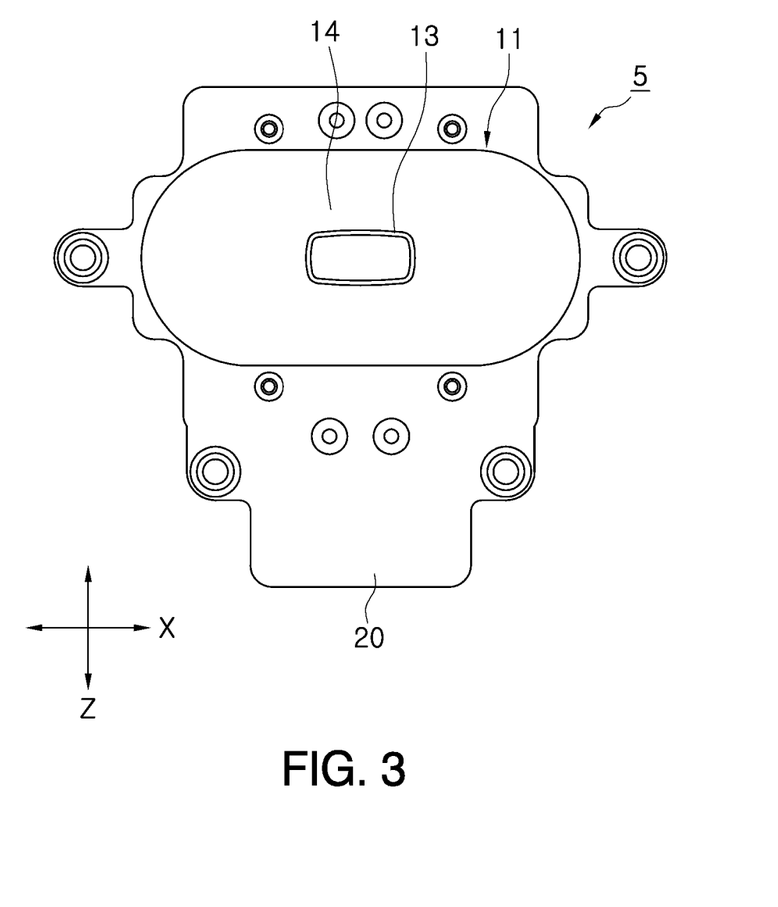
FIG. 3 is a front view illustrating an operation module assembly shown in FIG. 1.

As illustrated in FIGS. 4 to 6, the operation module 10 further includes a light source 12 for providing light. The light source 12 may be built in the button 11 to emit the light toward the surface of the button 11. For example, the light source 12 may include at least one light emitting diode. As illustrated in FIG. 3, the button 11 is provided with a light-transmitting area 13 through which light from the light source 12 passes and a light-blocking area 14 blocking light from the light source 12 on the surface thereof. The light-transmitting area 13 may be formed to have the shape of characters and/or figures indicating the function of the button 11. In the operation module 10, the light source 12 is maintained in an off state in the first position, and the light source 12 is maintained in an on state in the second position. For this change of state of the light source 12, the control unit 60 may control the light source 12 to be turned off when the operation module 10 is located in the first position, and control the light source 12 to be turned on when the operation module 10 is located in the second position. Due to the capability of switching between off and on states with respect to the light source 12, when the operation module 10 is located in the second position, the active state of the operation module 10 and the position of the button 11 may be more accurately recognized by the user.

The skin 30 has a constant light transmittance so that light from the light source 12 may pass through the skin 30, and the user's action state for manipulating the button 11 may be detected by the user detection sensor 50 although the user detection sensor 50 is provided around the opening 2 in the panel surface. For example, the skin 30 may be a sheet having light transmittance by being woven with fibers having flexibility.

As illustrated in FIGS. 4 to 6, the drive unit 40 may move the operation module 10 from the first position to the second position to make the button 11 protrude from the panel surface of the panel 1 (see FIG. 5), and may change the angle of the button 11 with respect to the panel surface of the panel 1 by rotating the protruded operation module 10 (see FIG. 6). Of course, conversely, the drive unit 40 may move the operation module 10 from the second position to the first position to return the position and angle of the button 11 to the original state (standby state) (see FIG. 4). The drive unit 40 includes an actuator 41 and a drive guide 45. The actuator 41 and the drive guide 45 are accommodated in the accommodating space 23.

The actuator 41 includes a rotary motor 41m, a rack 42, a pinion 43, and a connecting shaft 44.

In the actuator 41, the rack 42 is a moving body that moves linearly in the front-back direction (refer to the Y-axis direction). Although not shown, the rack 42 may be precisely moved in the front-back direction by a rack guide. The rack 42 is in the form of a circular or rectangular rod and extends in the front-back direction to have a constant length. The rack 42 has a front end rotatably connected to the rear portion of the operation module 10 by the connecting shaft 44 extending in the left-right direction that is orthogonal to the front-back direction (see X-axis direction in FIG. 3. The left-right direction is also referred to as a second direction). Therefore, the operation module 10 may be rotated about the connecting shaft 44 with respect to the rack 42. For example, the connecting shaft 44 in the left-right direction may be located at the rear lower side of the operation module 10, the rack 42 may have the front end rotatably coupled to the connecting shaft 44, the position of the connecting shaft 44 may be fixed by a support member or the like, and the support member may be provided at the rear portion of the operation module 10.

The pinion 43 is rotated in clockwise and counterclockwise directions by the rotary motor 41*m* in a state engaged with the rack 42. The position of the rotary motor 41*m* may be fixed to the base 21 or the base cover 22. When the pinion 43 is rotated by the rotary motor 41*m*, the rack 42 is moved in the front-back direction, and the operation module 10 is also moved with the rack 42 to the first position or the second position.

The drive guide 45 provides a guide path 48 for guiding a movement of the operation module 10 initiated by the actuator 41. To be specific, the drive guide 45 is configured to have a first path 48*s* and a second path 48*c* as the guide path 48. The first path 48*s* may induce a linear motion of the operation module 10 and the second path 48*c* may induce a rotary motion of the operation module 10 that has completed the linear motion. By the linear motion of the operation module 10, the button 11 may be flush with the panel surface of the panel 1 or protrude from the panel surface of the panel 1. By the rotary motion of the operation module 10, the angle of the button 11 may be adjusted.

The drive guide 45 includes a guide pin 46 and a pin guide member 47, which mate with each other, and the pin guide member 47 has the guide path 48.

The guide pin 46 is provided on the operation module 10 and is moved with the operation module 10, and induces linear motion and rotary motion of the operation module 10 in accordance with a guiding action of the guide path 48. The guide pin 46 extends in the left-right direction (refer to the X-axis direction), and is disposed at a position spaced apart from the connecting shaft 44 in an up-down direction (refer to Z-axis direction. The up-down direction is also referred to as a third direction). For example, the guide pin 46 may protrude from the rear portion of the operation module 10 in the left-right direction, and may be provided on an upper side of the connecting shaft 44. Here, the connecting shaft 44 corresponds to a connecting position that links the rack 42 and the operation module 10, and the up-down direction corresponds to a direction perpendicular to a plane created by an intersection of the front-back direction and the left-right direction.

The pin guide member 47 guides the guide pin 46 in a fixed position. The position of the pin guide member 47 may be fixed to the base 21 or the base cover 22. The guide pin 46 is inserted into the guide path 48 of the pin guide member 47. The guide path 48 may be provided in the form of a hole or groove into which the guide pin 46 is inserted. The first path 48*s* and the second path 48*c* of the guide path 48 are connected to each other. The first path 48*s* for inducing the linear motion of the operation module 10 is a linear path extending in a straight line along the front-back direction (refer to the Y-axis direction). The second path 48*c* for inducing the rotary motion of the operation module 10 extends from a front end of the first path 48*s*. To be specific, the second path 48*c* extends away from the connecting shaft 44 in the up-down direction (refer to the Z-axis direction). For example, the second path 48*c* may be an inclined path extending along a predetermined inclination angle with respect to the first path 48*s* and moving away from the connecting shaft 44, or may be a curved path extending along a predetermined curvature and moving away from the connecting shaft 44.

The drive unit 40 is configured such that, when the operation module 10 is located in the first position, the guide pin 46 provided on the operation module 10 is positioned in a rear end of the first path 48*s* provided in the pin guide member 47. At this time, the surface of the button 11 is flush with the panel surface of the panel 1, the operation module 10 is in an inactive state, and the light source 12 is kept off (see FIG. 4).

In this state, when the pinion 43 is rotated by the rotary motor 41*m*, and accordingly, the rack 42 is moved forward along the front-back direction, the guide pin 46 is moved along the first path 48*s* towards the front end of the first path 48*s*. At this time, the operation module 10 is directed from the first position to the second position by the linear motion as one of the moving actions of the drive unit 40, and the button 11 protrudes from the panel surface of the panel 1 (see FIG. 5).

When the rack 42 continues to move forward along the front-back direction, the guide pin 46 enters the second path 48*c* from the first path 48*s* and is moved along the second path 48*c* towards a front end of the second path 48*c*. At this time, the operation module 10 is rotated about the connecting shaft 44 in the left-right direction (refer to the X-axis direction) by the rotary motion as one of the moving actions of the drive unit 40, the angle of the button 11 is changed, an active state of the module 10 is maintained, and the light source 12 is kept lit (see FIG. 6). The angle of the protruding button 11 is determined by the moving distance of the rack 42 or the position of the guide pin 46 in the second path 48*c*.

Thereafter, when the rack 42 is moved rearward along the front-back direction, the operation module 10 in the second position is returned to the angle before the change by the rotary motion and then returned to the first position by the linear motion.

Meanwhile, although it has been described that the first direction is the front-back direction, the second direction orthogonal to the first direction is the left-right direction, and the operation module 10 is rotated about an axis (connection shaft, 44) in the second direction for the rotary motion, the embodiment is not limited thereto. Since the rotary motion of the operation module 10 is intended to change the angle of the button 11 in order for the user to conveniently manipulate the protruding button 11, depending on the position of the operation module 10, the shape of the button 11, etc., the second direction may be a direction other than the left-right direction, and the operation module 10 may be rotated about an axis of another second direction. Of course, according to this change, the direction perpendicular to the plane created by the intersection of the first direction and the second direction is also changed to a direction other than the up-down direction.

Although the present disclosure has been described above, the present disclosure is not limited by the disclosed embodiments and the accompanying drawings, and may be variously modified by those skilled in the art without departing from the technical spirits of the present disclosure. In addition, the technical spirits described in the embodiments of the present disclosure may be implemented independently, or may be implemented in combination of two or more.

What is claimed is:

1. An operation apparatus for a vehicle, the operation apparatus comprising:
    a panel provided in the vehicle;
    an operation module capable of moving between a first position and a second position located forward of the first position in a first direction through an opening of the panel, and having a button disposed at a front end thereof; and
    a drive unit configured to move the operation module from the first position to the second position to make the button protrude from a surface of the panel, and to change an angle of the protruded button by including a rotary motion,
    wherein the drive unit comprises:
    an actuator having a moving body that linearly moves in the first direction, wherein the moving body is rotatably connected to a side of a rear portion of the operation module by a connecting shaft extending in a second direction orthogonal to the first direction; and
    a guide that provides a guide path for guiding the moving of the operation module from the first position to the second position, wherein the moving of the operation module is initiated by the actuator and the guide path includes a first path inducing a linear motion of the operation module and a second path inducing the rotary motion of the operation module.

2. The operation apparatus for a vehicle of claim 1, wherein the guide includes a guide pin and a pin guide member,
    wherein the guide pin and the pin guide member mate with each other;
    the guide pin protrudes from the operation module in the second direction, moves along the guide path, and is disposed to be spaced apart from a connecting position that links the moving body and the operation module along a third direction perpendicular to a plane created by an intersection of the first direction and the second direction; and
    the pin guide member has the guide path into which the guide pin is inserted, and is configured such that the first path is provided in the first direction and the second path extends from the first path so as to move away from the connecting position.

3. The operation apparatus for a vehicle of claim 1, further comprising:
    a finish skin that provides a finished surface by covering the surface of the panel and the button, has flexibility, and is configured such that a part covering the button is moved with the button so that a shape of the finished surface is changed according to a moving direction of the button.

4. The operation apparatus for a vehicle of claim 3, wherein the operation module has a light source built in the button,
    the button has a light-transmitting area on a surface thereof for transmitting light from the light source, and
    the finish skin is light-transmissive.

5. The operation apparatus for a vehicle of claim 1, further comprising:
    a sensor that detects a user's action state for manipulating the button; and
    a control unit for controlling the drive unit on the basis of a detection signal from the sensor.

6. The operation apparatus for a vehicle of claim 1, further comprising:
    a finish skin that provides a finished surface by covering the surface of the panel and the button, has flexibility, and is configured such that a part covering the button is moved with the button so that a shape of the finished surface is changed according to a moving direction of the button.

7. The operation apparatus for a vehicle of claim 6, wherein the operation module has a light source built in the button,
    the button has a light-transmitting area on a surface thereof for transmitting light from the light source, and
    the finish skin is light-transmissive.

8. The operation apparatus for a vehicle of claim 1, further comprising:
    a sensor that detects a user's action state for manipulating the button; and
    a control unit for controlling the drive unit on the basis of a detection signal from the sensor.

9. The operation apparatus for a vehicle of claim 2, further comprising:
    a finish skin that provides a finished surface by covering the surface of the panel and the button, has flexibility, and is configured such that a part covering the button is moved with the button so that a shape of the finished surface is changed according to a moving direction of the button.

10. The operation apparatus for a vehicle of claim 9, wherein the operation module has a light source built in the button,
    the button has a light-transmitting area on a surface thereof for transmitting light from the light source, and
    the finish skin is light-transmissive.

11. The operation apparatus for a vehicle of claim 2, further comprising:
    a sensor that detects a user's action state for manipulating the button; and
    a control unit for controlling the drive unit on the basis of a detection signal from the sensor.

* * * * *